US005979781A

United States Patent [19]
Fiedrich

[11] Patent Number: 5,979,781
[45] Date of Patent: Nov. 9, 1999

[54] HYDRONIC HEATING WITH SATELLITE DISTRIBUTION STATIONS FOR MULTI-TEMPERATURE SUPPLY WATER TO HEATING LOOPS

[75] Inventor: Joachim Fiedrich, Carlisle, Mass.

[73] Assignee: Stadler Corporation, Bedford, Mass.

[21] Appl. No.: 08/666,911

[22] Filed: Jun. 20, 1996

Related U.S. Application Data

[63] Continuation of application No. 08/324,232, Oct. 17, 1994, Pat. No. 5,617,994.
[51] Int. Cl.$^6$ ...................................................... F24D 3/02
[52] U.S. Cl. ............................................. 237/8 R; 237/59
[58] Field of Search ..................................... 237/8 R, 8 A, 237/59, 63

[56] References Cited

U.S. PATENT DOCUMENTS

| | | | |
|---|---|---|---|
| 1,993,685 | 3/1935 | Rosenblad | 237/8 R |
| 2,359,547 | 10/1944 | Colby | 237/63 |
| 2,559,253 | 7/1951 | Lingen et al. | 237/8 R |
| 4,601,426 | 7/1986 | Brosenius | 237/59 |
| 4,679,729 | 7/1987 | Petitjean | 237/8 R |
| 5,119,988 | 6/1992 | Fiedrich | 237/8 C |
| 5,347,825 | 9/1994 | Krist | 237/8 R |

Primary Examiner—William E. Tapolcai
Attorney, Agent, or Firm—Robert T. Dunn, Esq.

[57] ABSTRACT

A hydronic heating system having a source of hot supply water and a reservoir of cooler return water, a supply water line from the source, a return water line to the reservoir and a multitude of heating loops through which water flows to deliver heat, including: a main distribution station having a supply header, main heating loops, and a return header with a pump compelling circulation within the main station so that heat from the source flows to the main heating loops; and one or more satellite distribution stations, each with a supply header feeding water to satellite heating loops, and a satellite return header and pump compelling circulation within the satellite station; and a satellite injection water line and return water line for circulating some hot water from the main station to each satellite station so that heat from said main station flows to each satellite station.

12 Claims, 4 Drawing Sheets

HYDRONIC HEATING WITH SATELLITE DISTRIBUTION STATIONS FOR MULTI-TEMPERATURE SUPPLY WATER TO HEATING LOOPS

This application is a continuation of application Ser. No. 08/324,232, filed Oct. 17, 1994, now U.S. Pat. No. 5,617,994.

BACKGROUND OF THE INVENTION

This invention relates to hydronic heating systems for dwellings, offices, etc. and more particularly to systems having one or more satellite distribution stations feeding several kinds of heating loops requiring different temperature water and so providing multi-temperature heating loop operation.

Hydronic heating systems for heating the rooms in a dwelling, office, etc, are used widely in Europe and to a lesser extent in the United States. Water heated in a boiler is distributed to heating loops of tubing in the dwelling that carry the heat by radiation, conduction and convection to the rooms in the dwelling. A common technique provides a boiler hot water supply feeding the supply header of the distribution station for the heating loops and the boiler water return to which the station return header of the heating loops connects. The return water is heated in the boiler and sent out again to the station as hot supply water, and so the water is cycled through the essentially closed system. One or more water pumps in this system keep the water flowing and valves control water flow rates through the loops depending on demand.

A heating loop may include several heating elements like baseboard finned tubing or wall mounted radiators that are the principal heat exchangers of the loop, or the tubing itself may be the principal heat exchanger of the loop. In the latter case the tubing is usually buried in the floor of a room and the tubing heats the floor. Often the tubing is buried in a special concrete and so heat exchange is principally by conduction and radiation to the concrete, which in turn heats the room by some conduction and convection, but principally by radiation. Hence, this type of heating is called Radiant Floor Heating (RFH). Similarly, when the tubing is buried in the wall, the heating is called Radiant Wall Heating (RWH).

In such RFH and RWH systems and other hydronic heating systems using baseboard finned tubing elements or wall mounted radiators, the supply water temperature from the boiler must be controlled so that it does not exceed certain limits that are substantially lower than the usual boiler supply water temperature. There are several reasons for this: first, the temperature of radiator elements on the wall must not be so high that they are not safe to touch; second, for RFH the floor temperature must not be uncomfortable hot; and third, where the tubing is plastic, the water temperature for some plastic materials must not exceed about 140° F.

In hydronic heating systems subject to such water temperature limitations, where the boiler is powered by burning fossil fuels, the boiler water supply temperature is usually well above 140° F. and often at about 180° F. to 200° F., and so the boiler supply temperature must be stepped down before it is fed to the heating loops.

In the past, it has been the practice to mix relatively cooler boiler return water with the hot boiler supply water to "dilute" the temperature of the supply water fed to the heating loops. An electrically controlled motorized three-way mixing valve has been used in the boiler supply line that feeds the supply header for the heating loops, between the boiler supply and the heating loops supply header. The mixing valve has two inputs and one output. One input is directly from the boiler hot water supply, the other input is from the return header of the heating loops and the output is directly to the supply header of the heating loops. The mixing valve motor is electrically energized by remote reset controls that sometimes respond to outside ambient temperature, inside room temperature, boiler water temperature, supply header water temperature, etc.

In an effort to reduce expense, non-motorized three-way valves have been used in the boiler supply line. Systems using non-motorized three-way valves with supply header water temperature feedback are described in my U.S. Pat. No. 5,119,988, which issued Jun. 9, 1992, entitled: "Hydronic Heating Water Temperature Control System". That patent describes several hydronic heating systems with a non-motorized (non-electric) three-way valve having supply water temperature feedback to the valve controller. In some of those systems, the valve is a three-way diverting valve in the boiler return water line and in another system, it is a three-way mixing valve in the boiler supply water line. The diverting valve and the mixing valve are quite different. The diverting valve has one input and two outputs and diverts water from the return line (on the way from the heating loop return header to the boiler return), to the boiler supply line that feeds the loop supply header, diluting the supply water (reducing its temperature) that is fed to the heating loop supply header.

That patent also teaches use of a non-electric thermostatic actuator head attached to the valve for positioning the valve stem and controlled by a capillary temperature sensor. Thus, the valve is modulated by non-electric feedback of the diluted supply water temperature. The bulb of the capillary sensor is inserted into the diluted supply water or it may be clamped to the supply line next to the supply header so that it is at the temperature of water in the supply header. Capillary fluid in the bulb expands with temperature applying a pressure force through the capillary to the actuator head and so the valve is modulated to increase or decrease the flow of return water through the valve as necessary to maintain the temperature of the heating loop supply header water at or below a predetermined value. That value can be set by a mechanical setting on the actuator head and so an accurate reading of the supply header water temperature is made continuously and simultaneously any deviation from the setting is immediately nulled by modulating the valve.

Techniques for controlling heater loop supply header water temperature, depending on outdoor ambient temperature are described in my co-pending U.S. patent application Ser. No. 222,884, filed Apr. 5, 1994, entitled: "Hydronic Heating Outdoor Temperature Reset Supply Water Temperature Control system". That application describes systems using a modulated three-way valve that can be a diverting valve in the boiler return line or a mixing valve in the boiler supply line, wherein feedback to the valve is from the diluted supply water temperature and is derived from a sensor bulb immersed in the diluted supply water or clamped to the supply line next to the heating loop supply header so that it is at the temperature of the diluted supply water and that feedback is modified by outdoor ambient temperature that is derived from another sensor bulb exposed to outdoor air temperature. Fluid from both bulbs is connected by capillary tubes from the bulbs to the diverting valve actuator head which drives (pushes) the valve stem into the valve against the valve spring, or releases the valve stem so that the valve spring pushes it out and so the valve is modulated to increase or decrease the dilution of supply water, as necessary to maintain the diluted supply water temperature at a predetermined value depending on outdoor ambient temperature.

Embodiments described in said co-pending U.S. application Ser. No. 222,884 that use a mixing valve in the supply line show two different orientations and with different thermostatic actuator heads. The usual configuration of such a mixing valve is with the first input in line with the output and the second input at a right angle thereto. The usual orientation of such a mixing valve in the supply line of the hydronic heating system is with the first input from the boiler supply line, the second input from the return line and the output is to the heating loop supply header. In the new orientation of the mixing valve in the supply line, the inputs are reversed so that a conventional push/release type actuator head can be used on the valve to carry out the required performance.

RFH and RWH systems using embedded plastic tubing and other hydronic heating systems using wall radiators and/or baseboard finned tubing elements are some of the different kinds oh heating loops. Clearly, the temperature limitation of a heating loop depends first on how and where the loop is installed, creature comfort and the materials in the loop. As the term "kind" of loop is used herein, it means the temperature requirements and limitations of the loop and so loops of the same kind have the same temperature requirements and limitations. For example: the temperature of baseboard finned tubing radiator elements can be quite high, because they are metal tubes, can be shielded and are not usually touched, even accidentally, whereas wall radiators are not shielded and must not be too hot to touch; for RFH where the tubing is beneath the floor boards, the tubing can be hotter than where the tubing is on top of the floor boards; for RWH the tubing is covered by only thin gypsum board and so must be well below 100° F.; and even the best cross-linked plastic tubing should not be exposed to water above 140° F.

Where the hydronic system is used for ice and snow melting, thermal shock of the outdoor surface that is heated can occur even when there is a heat exchanger between the main or "front end" distribution station (the boiler water system) and the outdoor (anti-freeze) water system. Thermal shock and techniques of dealing with it are described in my co-pending U.S. patent application Ser. No. 275,492, filed Jul. 15, 1994, entitled: "Hydronic Heating System With High And Low Temperature Shock Protection".

Since the temperature of boiler supply water fed to the main distribution station is usually well above 140° F. and often at about 180° F. to 200° F., the boiler supply water temperature may be alright for some "kinds" of heating loops like baseboard finned copper tubing, but must be much lower for other "kinds" of heating loops like RWH. The present application describes techniques and systems that provide several echelons of temperature ranges of loop supply water to accommodate the requirements of different "kinds" of heating loops.

SUMMARY OF THE INVENTION

It is an object of the present invention to provide a hydronic heating systems for dwellings, offices, etc., having several echelons of temperature ranges of loop supply water to accommodate the requirements of different kinds of heating loops.

It is another object to provide a hydronic heating systems for dwellings, offices, etc., having one or more satellite distribution stations feeding heating loops lower temperature supply water and so providing multi-temperature heating loop operation.

It is another object to provide such a hydronic heating system that is relatively less expensive than prior systems of equivalent capacity and which avoids some of the limitations and disadvantages of the prior systems.

It is another object to provide a hydronic heating system with two or more ranges of supply water temperature that is satisfactory to avoid feeding excessively high temperature boiler supply water to the system different kinds of heating loops.

It is another object to provide such a hydronic heating system with heating loop supply water temperature control that can be readily adjusted to change the desired water temperature feeding the system different kinds of heating loops.

It is another object to provide such a hydronic heating system with controls for heating loop supply water temperature that can be readily adjusted to change the desired water temperature feeding the system heating loops of different kinds, such as baseboard heaters, wall heaters, RFH tubing, RWH tubing and outdoor ice and snow melting.

It is a particular object of the first embodiment described herein to provide a hydronic heating system with a main distribution station without boiler supply water temperature dilution, feeding one or more satellite distribution stations that operate at lower water temperature to accommodate the requirements of different kinds of heating loops and respond to outside ambient temperature.

It is a particular object of the second embodiment described herein to provide a hydronic heating system with a main or front end distribution station with supply header water temperature dilution using a diverting valve in the boiler return line with a thermostatic actuator head and thermostatic control system that responds to outside ambient temperature and feeds one or more satellite distribution stations that operate at lower water temperature to accommodate the requirements of different kinds of heating loops and for which ΔT is set.

It is a particular object of the third embodiment described herein to provide a hydronic heating system with a main or front end distribution station with supply header water temperature dilution using a diverting valve in the boiler return line with a thermostatic actuator head and thermostatic control system that responds to outside ambient temperature and feeds one or more satellite distribution stations that operate at lower water temperature to accommodate the requirements of different kinds of heating loops and for which ΔT is controlled by water temperature feedback in the satellite distribution station.

It is a particular object of the fourth embodiment described herein to provide a hydronic heating system with a main or front end distribution station with supply header water temperature dilution using a mixing valve in the boiler supply line with a thermostatic actuator head and thermostatic control system that responds to outside ambient temperature and feeds one or more satellite distribution stations that operate at lower water temperature to accommodate the requirements of different kinds of heating loops as in any of the first, second or third embodiments herein.

It is a particular object of the fifth embodiment described herein to provide a hydronic heating system with a main or front end distribution station with supply header water temperature dilution using a motorized mixing valve in the boiler supply line with an electric controller that responds to outside ambient temperature and feeds one or more satellite distribution stations that operate at lower water temperature to accommodate the requirements of different kinds of heating loops as in any of the first, second or third embodiments herein.

In all embodiments of the present invention a main or front end distribution system is provided that feeds the high temperature loops of the system and also feeds a first satellite distribution station that operates at medium temperature and a second satellite distribution station that operates at low temperature and each distribution station has a station pump.

These and other features of the present inventions are revealed by the following description of embodiments of the inventions taken in conjunction with the figures.

DESCRIPTION OF EMBODIMENTS OF THE INVENTION

An advantage of the present invention is that only one main or front end distribution station is used for several relatively low cost satellite sub-stations that can each be temperature modulated in parallel at lower water temperatures. A high limit balancing valve at the main station supply manifold allows for adjustment of the desired lower temperature for each satellite. This is a desirable feature for domestic hydronic heating systems especially for RFH systems with multiple types of finish floor coverings (carpet/ tile/wood flooring) or systems with multiple kinds of radiation (baseboard finned radiator elements, wall radiators, RFH or RWH heating).

The injection and return lines from the main distribution system to each satellite can be small diameter metal or plastic tubes since flow rates between the main and the satellite are usually very low. However, full flow rate within the satellite heat distribution loop is assured by means of a satellite circulator pump, which also functions as a mixing device to mix the satellite loop water return with the higher temperature injected water from the main system.

In some embodiments a flow meter at the injection point in the satellite system aids in fine tuning the temperature differential between the main and the satellite system. An electric or thermostatic, two-position or modulated, injected flow control valve in the satellite injection line or the satellite return line, from or to the main distribution station provides for individual satellite water temperature control. This control valve in the satellite station, in effect, controls the rate of flow of main supply water to the satellite station, and so it controls the heat flow rate (BTU flow rate) from the main to the satellite.

The second to fifth embodiments of the present invention also provide for supply water temperature dilution and feedback control in the main station distribution system with temperature feedback from the supply header water as a function of outdoor ambient temperature and means for selecting the function (Adjustment A) and setting the desired loop supply header water temperature. Details of this main supply header water temperature control are described in several embodiments in my above described co-pending U.S. patent application Ser. No. 222,884.

First Embodiment

Figure 1:
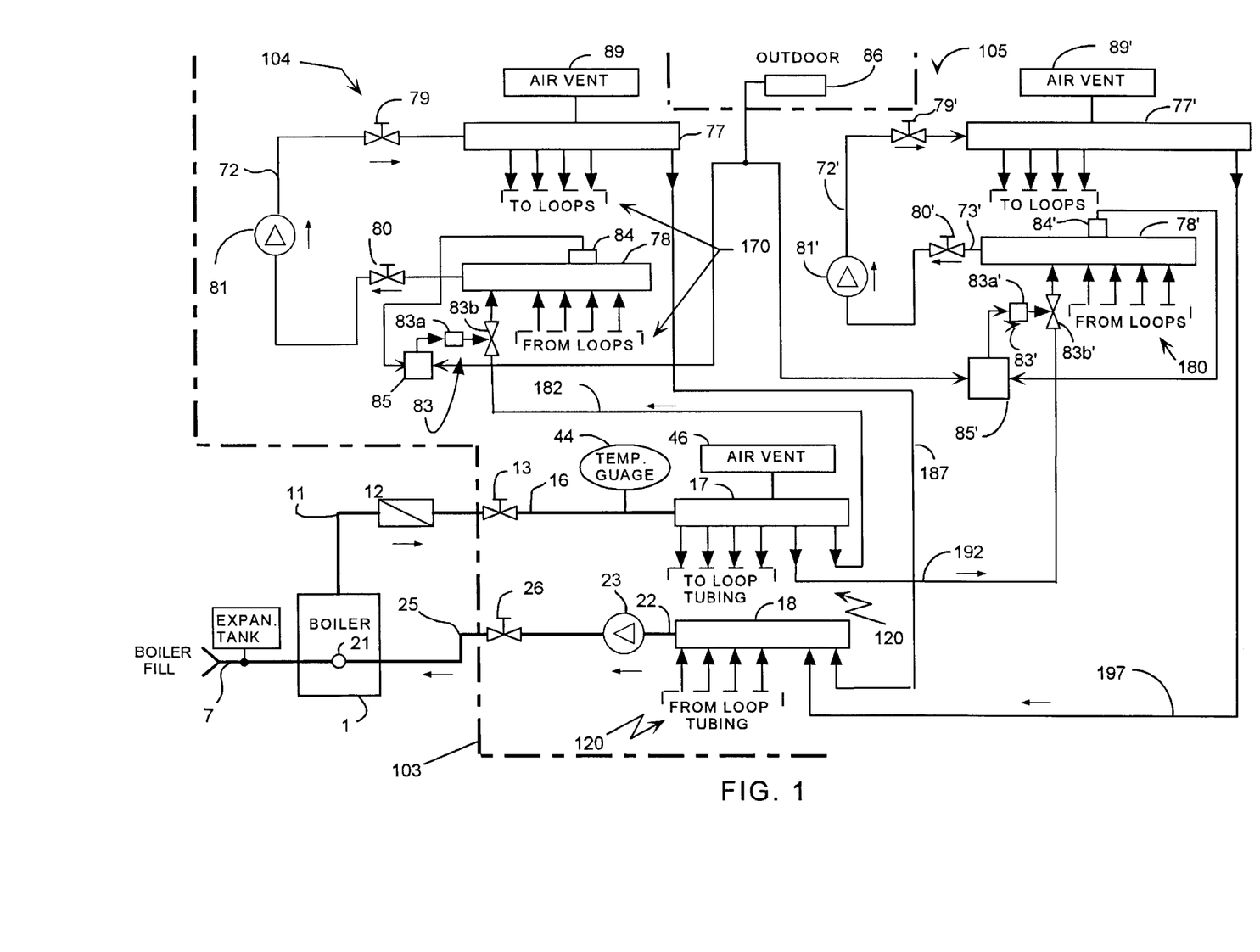
FIG. 1 is a schematic diagram of the first embodiment wherein a hydronic heating system with a main distribution station without boiler supply water temperature dilution feeding one or more satellite distribution stations that operate at lower water temperature to accommodate the requirements of different kinds of heating loops for which $\Delta T$ is controlled by satellite water temperature feedback and outside ambient temperature.

System With No Dilution In The Main Station,
Two Satellites And Outdoor Temperature Control
On Each Satellite Turning first to FIG. 1 there is a schematic diagram of a typical hydronic heating system installed in a dwelling incorporating the first embodiment of the present invention. The system includes a boiler 1 that supplies the main hydronic distribution station 103 and its two satellites 104 and 105. It may also supply the dwelling domestic hot water (DHW) tank (not shown). The usual requirement of the system is to provide DHW water at about 180° F. to 200° F., which is the usual hot water temperature requirement for washing machines and dish washers. The same boiler supply also feeds the main distribution station 103.

Main Station: As shown, main distribution station 103 includes four heating loops 120, which accept supply water at the high temperature 180° F. The boiler supply line 11 to main station 3 includes a unidirectional check valve 12, an isolation ball valve 13 and the continuation 16 of supply line 11 to the main heating loop supply header 17 that feeds the several (four) high temperature heating loops 120. A separate loop tubing connection to the supply header 17 is provided for each loop. At the other end of each loop a similar tubing connection is provided to the return header 18. The return line from header 18 to the boiler return reservoir 21 includes a first section 22 to water pump 23, boiler return line 25 and isolation ball valve 26 in the return line.

A visible temperature gauge 44 is attached to line 16 close to header 17 in intimate thermal contact with the line so that it displays a temperature as near to the temperature of the supply water as possible. For added safety and ease of maintenance, the supply header 17 may be equipped with an air vent 46. Supply water flow to each of heating loops may be controlled by a balancing valve (not shown) with an internal position set screw.

Satellite Stations 104 and 105: The satellite distribution stations 104 and 105 in this embodiment may be the same except for operation. Station 104 may be set for medium temperature, as compared to the main which operates at high temperature and station 105 may be set for low temperature. For example, when high temperature is 180° F., medium may be 135° F. and low may be 90° F.

Station 104 set for medium temperature has a supply header 77 and return header 78 with tubing connections to loops 170, The circulation system for station 103 includes return header line 73 from return header 78, isolation ball valve 80 to the low pressure side of pump 81 and from the high pressure side of the pump supply line 72 through isolation ball valve 79 to supply header 77. This maintains continuous circulation of the satellite station water between the headers through loops 170.

The temperature of water in satellite 104 is maintained at the medium level (135° F.) by the controlled flow of high temperature (180° F.) water from main distribution supply header 17 via relatively small diameter station 104 supply line 182 that feeds from main header 17 to the satellite return header 78, via solenoid operated (on/off) two-way valve 83. That valve is controlled by the combination of water temperature feedback from the return header, detected by electric temperature transducer 84, and outside ambient temperature, detected by electric temperature transducer 86. The electric signals from those transducers are combined by solenoid control circuit 84, which controls the valve solenoid 83a, thereby controlling the flow of hot injected water into the satellite station. This feed of hot water into the satellite station is referred to herein as the injection point, or more particularly the BTU injection point.

Water return from satellite station 104 to the main station is by small diameter station 104 return line 187 from supply header 77 to the main station return header 18 and for safety and ease of maintenance, the satellite supply header 77 may be equipped with an air vent 89.

In operation, solenoid control circuit 85 is set to maintain the satellite return water temperature in header 78 at medium (135° F.) for medium outdoor ambient temperature (about 50° F.), while the main station operates at high temperature (180° F). Thereafter, when outside temperature drops below 50° F., solenoid valve 83 opens and closes to maintain the satellite water temperature at a slightly higher level to accommodate the increase in BTU flow demand of the loops due to the lower ambient temperature. On the other hand, when outside ambient temperature rises, solenoid valve 83 opens and closes to maintain the satellite water temperature at a slightly lower level to accommodate the decrease in BTU flow demand of the loops due to the higher ambient temperature. In a similar way, the temperature of water in satellite station 105 is maintained at a predetermined low temperature (90° F.) by controlled injection flow from the main station. Station 105 set for low temperature has a supply header 77' and return header 78' with tubing connections to loops 180, The circulation system includes return header line 73' from return header 78', valve 80' to the low pressure side of pump 81' and supply line 72' through valve 79' to supply header 77', maintaining continuous circulation of satellite station 105 water between the headers through loops 180.

The temperature of water in satellite 105 is maintained at the low level (90° F.) by the controlled flow of high temperature (180° F.) water from main station supply header 17 via relatively small diameter station 105 supply line 192 that feeds from main header 17 to the satellite return header 78', via solenoid operated (on/off) two-way valve 83', which is controlled by the combination of water temperature feedback from the return header, detected by electric temperature transducer 84', and outside ambient temperature, detected by electric temperature transducer 86. The electric signals from those transducers are combined by solenoid control circuit 85', which controls the valve solenoid 83a, thereby controlling the flow of hot injected water into the satellite station {BTU injection point}.

Water return from satellite station 105 to the main station is by small diameter station 105 return line 197 from supply header 77' to the main station return header 18 and for safety and ease of maintenance, the satellite supply header 77' may be equipped with an air vent 89'.

In operation, solenoid control circuit 85' is set to maintain the satellite return water temperature in header 78 at low (90° F.) for medium outdoor ambient temperature (about 50° F.), while the main station operates at high temperature (180° F.). Thereafter, when outside temperature drops below 50° F., solenoid valve 83' opens and closes to maintain the satellite water temperature at a slightly higher level to accommodate the increase in BTU flow demand of the loops due to the lower ambient temperature; or when outside ambient temperature rises, solenoid valve 83' opens and closes to maintain the satellite water temperature at a slightly lower level to accommodate the decrease in BTU flow demand of the loops due to the higher ambient temperature.

Second Embodiment

Figure 2:
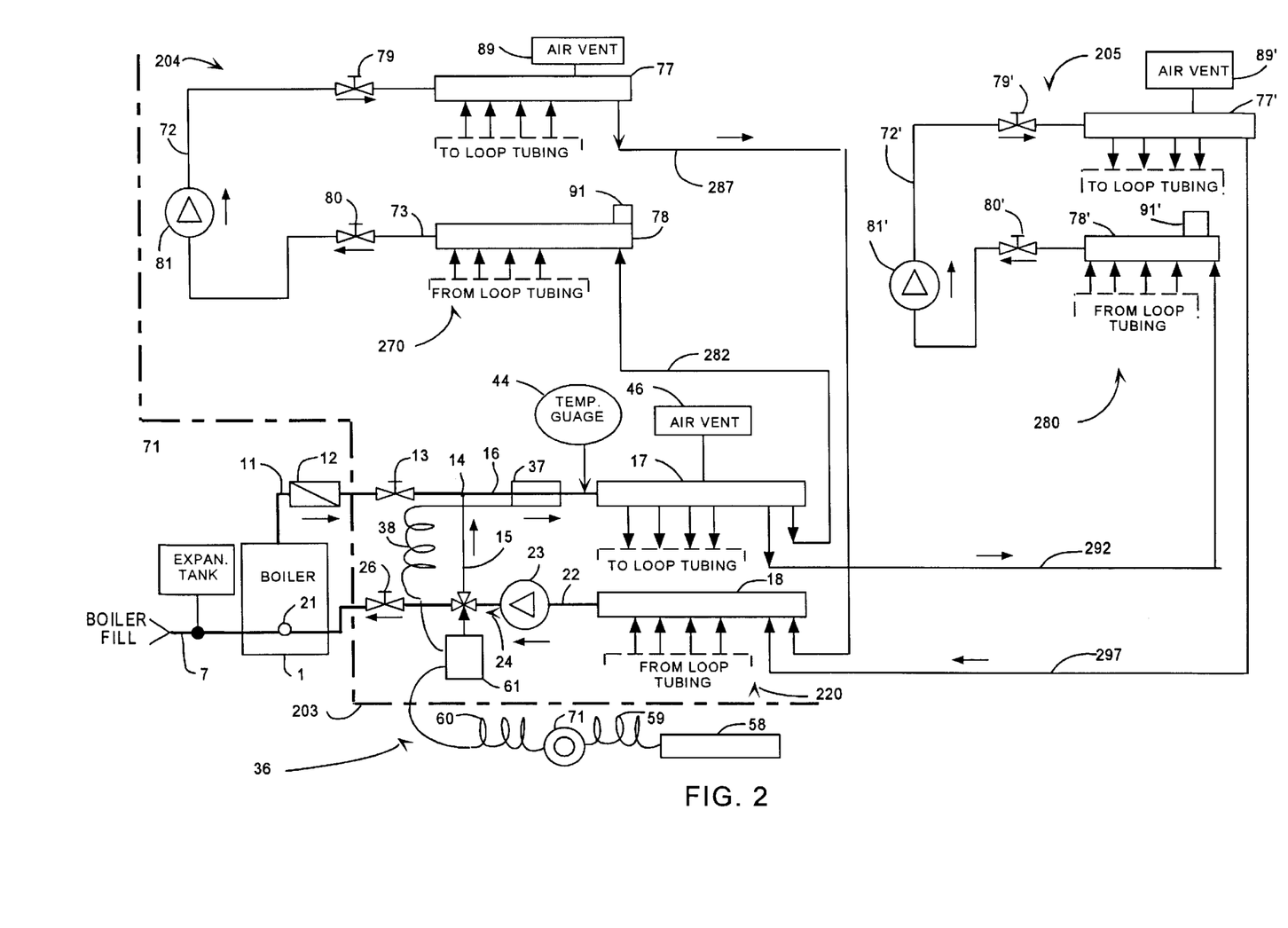
FIG. 2 is a schematic diagram of the second embodiment wherein a hydronic heating system with a main distribution station with supply header water temperature dilution using a diverting valve in the boiler return line with a thermostatic actuator head and thermostatic control system that responds to outside ambient temperature, feeds one or more satellite distribution stations that operate at lower water temperature to accommodate the requirements of different kinds of heating loops and for which $\Delta T$ is set.

System With Dilution By Diverting Valve In The Main Station, Two Satellites And Outdoor Temperature Control On The Main Station Main Station: As shown in FIG. 2, main distribution station 203 includes four heating loops 220, which require supply water temperature at substantially lower than 180° F. and so for those loops, return water is diverted to the loop supply, diluting the boiler supply thereto and so reducing the temperature of the loop supply water to within the required limits. For example, these loops may have a high limit of 160° F .

Main station 203 incorporates a three-way modulated diverting valve in the return line. The boiler supply line 11 to the station includes check valve 12, isolation valve 13, a T connection 14 to diverting line 15 and the continuation 16 of supply line 11 to loop supply header 17 that feeds the several heating loops 220. A separate loop tubing connection to the supply header 17 is provided for each loop. At the other end of each loop a similar tubing connection is provided to the return header 18. The return line from header 18 to the boiler return reservoir 21 includes a first section 22 to water pump 23, three-way modulated diverting valve 24, boiler return line 25 and isolation valve 26.

Three-way modulated diverting valve 24 has one water flow input from pump 23, receiving return water from the heating loops, a first water flow output to the boiler return line 25 and a second water flow output to diverting line 15 that connects to the supply line T connection 14. A suitable structure of diverting valve 24 is shown and described in said co-pending U.S. patent application Ser. No. 222,884.

Modulation of valve 24 is by a conventional push/release type actuator head adapted herein for dual temperature input in diverting valve control system 36 provides this control action to the valve stem. It is a non-electric, thermostatic, automatic push/release type, dual temperature actuating system 36 for the diverting valve and includes: dual temperature actuator head 61; ratio setter device 71; supply header water temperature thermal sensor bulb 37; capillary line 38 from the sensor bulb to the actuator head; outdoor ambient temperature thermal sensor bulb 58; a capillary line 59 from the sensor bulb to the ratio setter device; and capillary line 60 from the ratio setter device to the actuator head. This control system is also shown and described in said co-pending U.S. patent application Ser. No. 222,884.

The sensor bulbs and capillaries contain a fluid that expands as the fluid temperature increases, delivering additional volume of fluid via the capillaries to the push/release type actuator head 61, which converts the increased fluid volume to a new position of the valve stem. Thus, when the temperature of the fluid in a sensor bulb increases, the valve stem position is changed to increase the diverted water flow and so reduce the temperature of the loop supply header water. In this way, the temperature of the diluted supply water flowing to the loops 220 supply header 17 (feedback temperature), combined with outdoor temperature, according to a selected operating curve (Adjustment A) is effective to modulate the valve to limit the water temperature as herein described.

Sensor bulb 37 is preferably located so as to detect the temperature of the supply water flow into header 17 that feeds the heating loops. This can be done simply by attaching the sensor bulb in intimate thermal contact with the outside of supply line 16 as shown in FIG. 2. For this purpose, the elongated sensor bulb 37 is oriented longitudinally along line 16 and is secured tightly thereto. A visible temperature gauge 44 is also attached to line 16 close to header 17 so that it displays a temperature as near to the temperature of the diluted supply water as possible. For added safety and ease of maintenance, the supply header 17 may be equipped with an air vent 46. Supply water flow to each of heating loops may be controlled by a balancing valve with an internal position set screw.

A suitable thermostatically controlled three-way diverting valve for use in this system is manufactured by F.W. Overtrop KG, of Olsberg, West Germany. A suitable conventional push/release type valve actuator head, sensor bulb and capillary for such an actuator head is also manufactured by Overtrop.

Satellite Stations 204 and 205: The satellite distribution stations 204 and 205 in this embodiment may be the same except for operation. Station 204 may be set for medium temperature, as compared to the main which operates at high temperature and station 205 may be set for low temperature. For example, when high temperature is 160° F., medium may be 120° F. and low may be 80° F.

Station 204 set for medium temperature has a supply header 77 and return header 78 with tubing connections to loops 270, The circulation system for this station includes return header line 73 from return header 78, isolation ball valve 80 to the low pressure side of pump 81 and from the high pressure side of the pump supply line 72 through isolation ball valve 79 to supply header 77. This maintains continuous circulation of the satellite station water between the headers through loops 270.

The temperature of water in satellite 204 supply header 77 is maintained at the medium level (120° F.) by the controlled flow of high temperature (160° F.) water from main distribution supply header 17 via relatively small diameter station 204 supply line 282 that feeds from main header 17 to the satellite return header 78. A flow meter 91 on the return header 78 at line 282 acts as a balancing valve regulating the injected flow rate of high temperature water from the main station. Flow meter 91 is preferably adjustable and so can be set to a flow rate limit to accomplish this regulation. This feed of high temperature water into the satellite station is referred to herein as the injection point, or more particularly the BTU injection point.

Water return from satellite station 204 to the main station is by small diameter station 204 return line 287 from supply header 77 to the main station return header 18. For safety and ease of maintenance, the satellite supply header 77 may be equipped with an air vent 89.

In operation, flow meter 91 is manually set to adjust the supply water temperature in header 77 to medium (120° F.) for medium outdoor temperature (about 50° F.) while the main station operates at high temperature (160° F.). Thereafter, when outside temperature drops below 50° F., the main station water high temperature is increased causing a corresponding increase in the medium temperature, (the supply water temperature at satellite station 204), to accommodate the increase in BTU flow demand of the lower ambient temperature. On the other hand, when outside ambient temperature rises, the main station water high temperature falls, reducing BTU flow to the satellite station.

In a similar way the temperature of water in satellite 205 supply header 77' is maintained at the low level (80° F.) by the controlled flow of high temperature (160° F.) water from main distribution supply header 17 via relatively small diameter station 205 supply line 292 that feeds from main station header 17 to the satellite return header 78'. A flow meter 91' on the return header 78' at line 292 acts as a balancing valve regulating the injected flow rate of high temperature water from the main station. This feed of high temperature water into the satellite station is referred to herein as the injection point, or more particularly the BTU injection point.

Water return from satellite station 205 to the main station is by small diameter station 205 return line 297 from supply header 77' to the main station return header 18. For safety and ease of maintenance, the satellite supply header 77' may be equipped with an air vent 89'.

Figure 3:
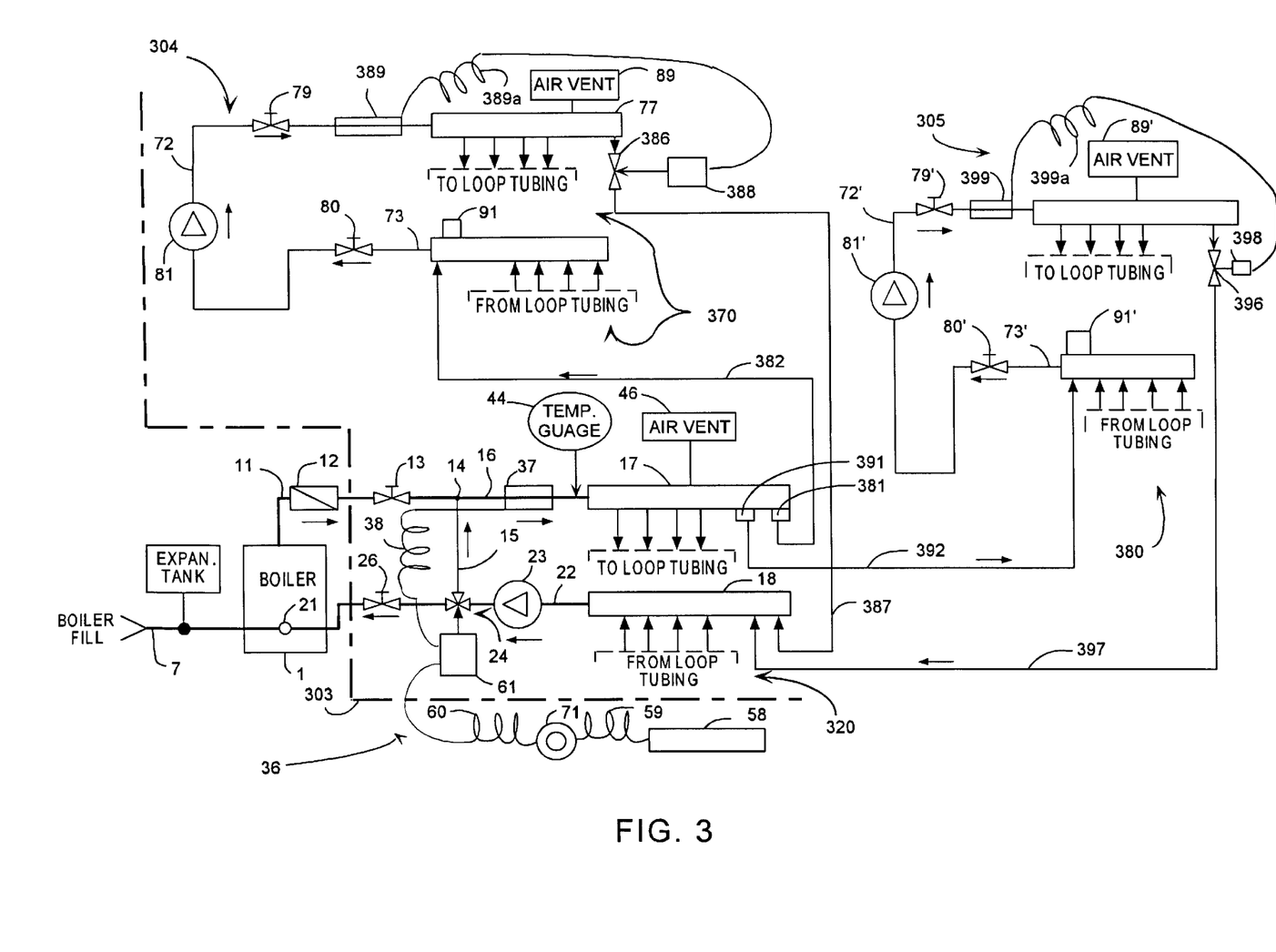
FIG. 3 is a schematic diagram of the third embodiment wherein a hydronic heating system with a main distribution station with supply header water temperature dilution using a diverting valve in the boiler return line with a thermostatic actuator head and thermostatic control system that responds to outside ambient temperature and feeds one or more satellite distribution stations that operate at lower water temperature to accommodate the requirements of different kinds of heating loops and for which $\Delta T$ is modulated by water temperature feedback in the satellite distribution station.

In operation, flow meter 91' is manually set to adjust the supply water temperature in header 77' to low (80° F.) for medium outdoor temperature (about 50° F.) while the main station operates at high water temperature (160° F.). Thereafter, when outside temperature drops below 50° F., the main station water high temperature is increased causing a corresponding increase in the low temperature, (the supply water temperature at satellite station 204), to accommodate the increase in BTU flow demand of the lower ambient temperature. On the other hand, when outside ambient temperature rises, the main station water high temperature falls, reducing BTU flow to the satellite station Third Embodiment System With Dilution By Diverting Valve In The Main Station, Outdoor Temperature Control, Two Satellites And Injection Control By Feedback In Each Satellite Main Station: As shown in FIG. 3, main distribution station 303 includes four heating loops 320, which require supply water temperature at substantially lower than 180° F. and so for those loops, return water is diverted to the loop supply, diluting the boiler supply thereto and so reducing the temperature of the loop supply water to within the required limits. For example, these loops may have a high limit of 160° F.

Main station 303 incorporates a three-way modulated diverting valve in the return line. The boiler supply line 11 to the station includes check valve 12, isolation valve 13, a T connection 14 to diverting line 15 and the continuation 16 of supply line 11 to loop supply header 17 that feeds the several heating loops 320. A separate loop tubing connection to the supply header 17 is provided for each loop. At the other end of each loop a similar tubing connection is provided to the return header 18. The return line from header 18 to the boiler return reservoir 21 includes a first section 22 to water pump 23, three-way modulated diverting valve 24, boiler return line 25 and isolation valve 26.

Three-way modulated diverting valve 24 has one water flow input from pump 23, receiving return water from the heating loops, a first water flow output to the boiler return line 25 and a second water flow output to diverting line 15 that connects to the supply line T connection 14. A suitable structure of diverting valve 24 is shown and described in said co-pending U.S. patent application Ser. No. 222,884.

Modulation of valve 24 is by a conventional push/release type actuator head adapted herein for dual temperature input in diverting valve control system 36 provides this control action to the valve stem. It is a non-electric, thermostatic, automatic push/release type, dual temperature actuating system 36 for the diverting valve and includes: dual temperature actuator head 61; ratio setter device 71; supply header water temperature thermal sensor bulb 37; capillary line 38 from the sensor bulb to the actuator head; outdoor ambient temperature thermal sensor bulb 58; a capillary line 59 from the sensor bulb to the ratio setter device; and capillary line 60 from the ratio setter device to the actuator head. This control system is also shown and described in said co-pending U.S. patent application Ser. No. 222,884.

The sensor bulbs and capillaries contain a fluid that expands as the fluid temperature increases, delivering additional volume of fluid via the capillaries to the push/release type actuator head 61, which converts the increased fluid volume to a new position of the valve stem. Thus, when the temperature of the fluid in a sensor bulb increases, the valve stem position is changed to increase the diverted water flow and so reduce the temperature of the loop supply header water. In this way, the temperature of the diluted supply water flowing to the loops 320 supply header 17 (feedback temperature), combined with outdoor temperature, according to a selected operating curve (Adjustment A) is effective to modulate the valve to limit the water temperature as herein described.

Sensor bulb 37 is preferably located so as to detect the temperature of the supply water flow into header 17 that feeds the heating loops. This can be done simply by attaching the sensor bulb in intimate thermal contact with the outside of supply line 16 as shown in FIG. 3. For this purpose, the elongated sensor bulb 37 is oriented longitudinally along line 16 and is secured tightly thereto. A visible temperature gauge 44 is also attached to line 16 close to header 17 so that it displays a temperature as near to the temperature of the diluted supply water as possible. For added safety and ease of maintenance, the supply header 17 may be equipped with an air vent 46. Supply water flow to each of heating loops may be controlled by a balancing valve with an internal position set screw.

A suitable thermostatically controlled three-way diverting valve for use in this system is manufactured by F.W. Overtrop KG, of Olsberg, West Germany. A suitable conventional push/release type valve actuator head, sensor bulb and capillary for such an actuator head is also manufactured by Overtrop.

Satellite Stations 304 and 305: The satellite distribution stations 304 and 305 in this embodiment may be the same except for operation. Station 304 may be set for medium temperature, as compared to the main which operates at high temperature and station 205 may be set for low temperature. For example, when high temperature is 160° F., medium may be 120° F. and low may be 80° F.

Station 304 set for medium temperature has a supply header 77 and return header 78 with tubing connections to loops 370, The circulation system for this station includes return header line 73 from return header 78, isolation ball valve 80 to the low pressure side of pump 81 and from the high pressure side of the pump supply line 72 through isolation ball valve 79 to supply header 77. This maintains continuous circulation of the satellite station water between the headers through loops 370.

The temperature of water in satellite 304 supply header 77 is maintained at the medium level (120° F.) by the controlled flow of high temperature (160° F.) water from main distribution supply header 17 via relatively small diameter station 304 supply line 382 that feeds from main header 17 to the satellite return header 78. That feed begins at high limit balancing valve 381 on main station supply header 17, via line 382, to satellite 304 supply header 77. A flow meter 91 on the return header 78 at line 382 acts as a balancing valve for fine tuning the injected flow rate of high temperature water from the main station. This feed of high temperature water into the satellite station is referred to herein as the injection point, or more particularly the BTU injection point.

The primary control of the flow of injected high temperature water into satellite station 304 from the main station is in the station return line 387. It is from the satellite supply header 77, via thermostatically controlled two-way modulating valve 386 and return line 387 to the main station return header 18. Valve 386 is modulated by thermostatic actuator head 388 that is controlled by the temperature of capillary sensor bulb 389 via capillary line 391 from the bulb to the actuator. The bulb is thermally attached to the line 72 into the satellite supply header 77 so that the fluid in the bulb is at the line water temperature. For safety and ease of maintenance, the satellite supply header 77 may be equipped with an air vent 89.

In operation, valve 386 and/or its actuator 388 is manually set to close at a maximum temperature of the satellite supply water in header 77. Below that temperature, the valve is modulated open allowing water flow between the main and the satellite stations and so the supply water temperature in header 77 rises. In this way, the satellite water temperature is modulated around the desired medium temperature. Flow meter 91 allows for fine tuning the temperature differential.

Thereafter, when outside temperature rises or falls, the main station water high temperature rises or falls, However, this does not cause a corresponding rise or fall temperature which is fixed when the thermostatic control of valve 386 and actuator 388 is set.

In a similar way the temperature of water in satellite 305 supply header 77' is maintained at the low level (80° F.) by the controlled flow of high temperature (160° F.) water from main distribution supply header 17 via relatively small diameter station 305 supply line 392 that feeds from main station header 17 to the satellite return header 78'. The circulation system for this station includes return header line 73' from return header 78', isolation valve 80' to the low pressure side of pump 81' and from the high pressure side of the pump supply line 72' through isolation valve 79' to supply header 77'. This maintains continuous circulation of the satellite station water between the headers through loops 380.

The temperature of water in satellite 305 supply header 77' is maintained at the low level (80° F.) by the controlled flow of high temperature (160° F.) water from main distribution supply header 17 via relatively small diameter station 305 supply line 382 that feeds from main header 17 to the satellite return header 78. That feed begins at high limit balancing valve 391 on main station supply header 17, via line 392, to satellite 305 supply header 77'. A flow meter 91' on the return header 78' at line 392 acts as a balancing valve for fine tuning the injected flow rate of high temperature water from the main station. This feed of high temperature water into the satellite station is referred to herein as the injection point, or more particularly the BTU injection point.

The primary control of the flow of injected high temperature water into satellite station 305 from the main station is in the station return line 397. It is from the satellite supply header 77', via thermostatically controlled two-way modulating valve 396 and return line 397 to the main station return header 18. Valve 396 is modulated by thermostatic actuator head 398 that is controlled by the temperature of capillary sensor bulb 399 via capillary line 399a from the bulb to the actuator. The bulb is thermally attached to the line 72' into the satellite supply header 77' so that the fluid in the bulb is at the line water temperature. For safety and ease of maintenance, the satellite supply header 77' may be equipped with an air vent 89'.

In operation, valve 396 and/or its actuator 398 is manually set to close at a maximum temperature of the satellite supply water in header 77'. Below that temperature, the valve is modulated open allowing water flow between the main and the satellite stations and so the supply water temperature in header 77' rises. In this way, the satellite water temperature is modulated around the desired medium temperature. Flow meter 91' allows for fine tuning the temperature differential.

Thereafter, when outside temperature rises or falls, the main station water high temperature rises or falls, However, this does not cause a corresponding rise or fall temperature which is fixed when the thermostatic control of valve 396 and actuator 398 is set.

Fourth Embodiment

Figure 4:
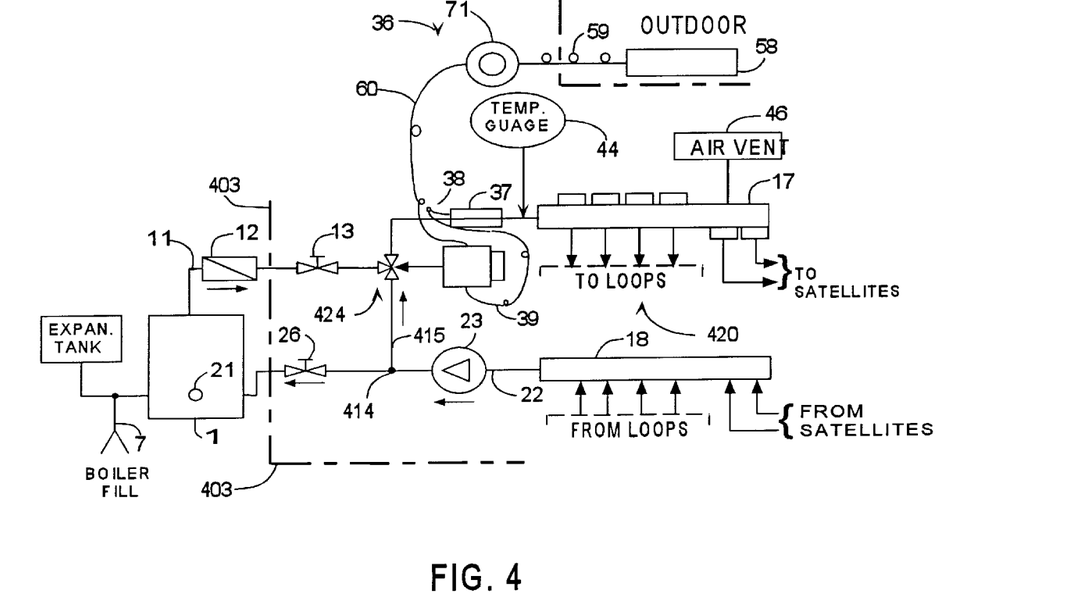
FIG. 4 is a schematic diagram of the fourth embodiment wherein a hydronic heating system with a main distribution station with supply header water temperature dilution using a mixing valve in the boiler supply line with a thermostatic actuator head and thermostatic control system that responds to outside ambient temperature and feeds one or more satellite distribution stations that operate at lower water temperature to accommodate the requirements of different kinds of heating loops as in any of the first, second or third embodiments herein.

System With Dilution By Unconventional Orientation of Mixing Valve In The Main Station, Outdoor Temperature Control And Any Of The Satellite Configurations Of The First, Second or Third Embodiments FIG. 4 is a schematic diagram of the main distribution station according to the fourth embodiment herein. The boiler 1 supplies the system distribution station 403 and the domestic hot water (DHW) tank (not shown) water at about 180° F. to 200° F., as required for washing machines and dish washers and also feeds the main distribution station. As shown, the main station includes four heating loops 420 between supply header 17 and return header 18, which require that the supply water temperature be substantially lower than 180° F. and so the supply water is diluted with return water, reducing the temperature of the loop supply water to within the required limits.

The distribution station 403 incorporating the unconventional {new} orientation of a conventional three-way modulated mixing valve 424 in the boiler supply line 11. The boiler supply line also includes a check valve 12, isolation valve 13 and the continuation 16 of supply line 11 to heating loop supply header 17 that feeds the several (four) heating loops 420, a separate loop tubing connection to the supply header being provided for each loop and at the other end of each loop a similar tubing connection is provided to the return header 18.

The return line from header 18 to the boiler return reservoir 21 includes a first section 22 to water pump 23, a T connector 414 to the mixing valve 424, boiler return line 25 and isolation valve 26 in the return line.

The conventional mixing valve 424 has two inputs: the first or through input and the second or perpendicular input; and one through output. In the conventional (usual) orientation of this valve in the system supply line, the first input is fed directly by the boiler supply line, the second input is fed by shunt line from the boiler return line and the output is to the supply header line. However, the new orientation, shown in FIG. 4 is used in this embodiment by switching the inputs, so that the second input is fed directly by boiler supply line 11 and the first input is fed by return water shunt line 415. This unconventional (new) orientation of a mixing valve, the structure of the mixing valve and operation are also shown and described in said co-pending U.S. patent application Ser. No. 222,884.

Thus, the mixing valve position in this new orientation, without an actuator head (no stem stop) is for minimum dilution, because there is no stop provided by an actuator head and so the valve spring drives the stem until the valve return flow plug contacts the return flow seat. This is a not a fail-safe position, because it sends supply water at maximum temperature to the heating loops. A fail safe position is the valve position that sends minimum temperature water to the heating loops. Techniques for limiting the water temperature sent to the heating loops in case the actuator is removed or fails on a diverting valve are described in my U.S. Pat. No. 5,209,401, issued May 11, 1993, entitled: "Hydronic Heating Water Temperature Control Valve". Those techniques can also be used on the mixing valve in this embodiment for the same purpose. They would prevent complete closure of the return water input.

Mixing valve 424 control system 36 (as in the second and third embodiments) is a dual temperature, non-electric, thermostatic, automatic, valve control system and provides the mixing valve stem stop, by pushing or releasing the stem to dilute the hot supply water as required. It includes: push/release type, dual temperature, mixing valve actuator head 61; ratio setter device 71; supply header water temperature thermal sensor bulb 37 and a capillary line 38 from the sensor bulb to the head; outdoor ambient temperature thermal sensor bulb 58 and a capillary line 59 from the sensor bulb to the ratio setter device 71; and capillary line 60 from the ratio setter device to the actuator head. Actuator head 61 may be the same as actuator head 61 used on the diverting valve in the second and third embodiments and is shown and described in detail in said co-pending U.S. patent application Ser. No. 222,884.

As in the second embodiment, the loop supply header water temperature (feedback) is provided by temperature sensor bulb 37 oriented longitudinally along line 16 and secured thereto. Visible temperature gauge 44 is also attached to line 16 close to header 17 in thermal contact with the line so that it displays the temperature of the diluted supply water that is fed to the heating loop supply header.

The main station distribution system 403 shown in FIG. 4 can be used with the satellite systems described hereinabove in any of the first, second or third embodiments. For connection to satellite systems like 304 and 305 in the third embodiment (FIG. 3), high limit balancing valves 381 and 391 feed the small diameter insertion lines 382 and 392 of the medium and low temperature satellite systems 304 and 305, respectively. For the first and the second embodiment satellite systems, the insertion lines are fed directly from header 17. Return lines from the satellites, like small diameter lines 387 and 397 from the medium and low temperature satellites 304 and 305, respectively, feed directly into return header 18.

Fifth Embodiment

Figure 5:
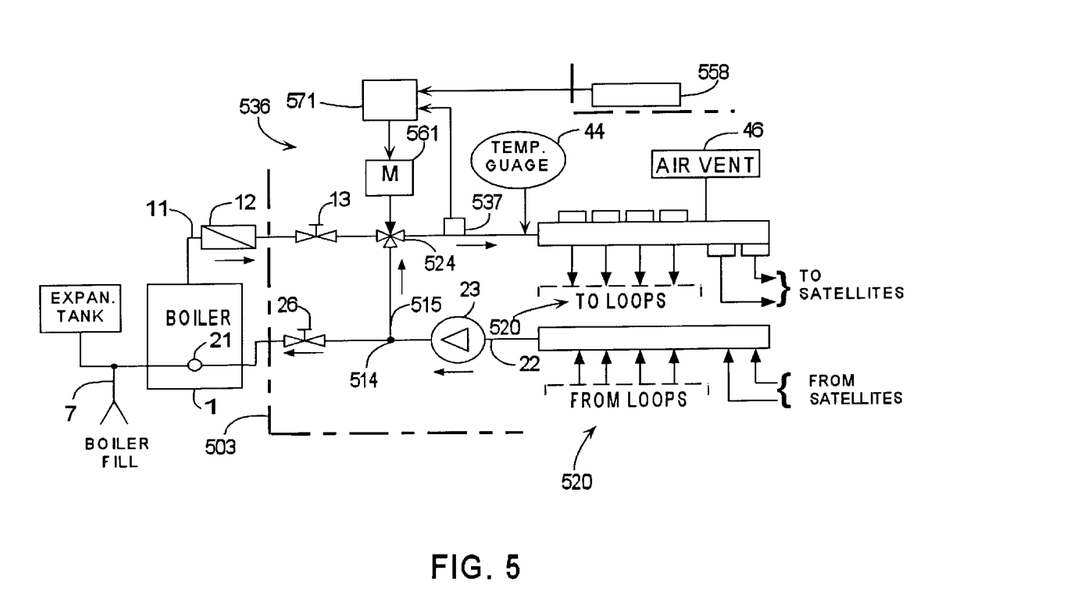
FIG. 5 is a schematic diagram of the fifth embodiment wherein a hydronic heating system with a main distribution station with supply header water temperature dilution using a motorized mixing valve in the boiler supply line with an electric controller that responds to outside ambient temperature and feeds one or more satellite distribution stations that operate at lower water temperature to accommodate the requirements of different kinds of heating loops as in any of the first, second or third embodiments herein.

System With Dilution By Conventional Orientation of Mixing Valve In The Main Station, Outdoor Temperature Control And Any Of The Satellite Configurations Of The First, Second, Third Or Fourth Embodiments FIG. 5 is a schematic diagram of a typical hydronic heating system installed in a dwelling incorporating the third embodiment of the invention. Reference numbers used in this embodiment are the same as in the other embodiments where the parts may be the same. This, however, does not include the mixing valve 524, which is a motorized, three-way mixing valve in the conventional {usual} orientation in the station supply line. The valve dual temperature electric control system 536 that responds to diluted supply water temperature and outdoor temperature from line temperature transducer 537 fed to electric controller 571 that controls the valve motor 561.

As in the other embodiments, boiler 1 supplies the system distribution station 503 and the domestic hot water (DHW) tank (not shown) and the hydronic heating system includes four heating loops 520 between supply header 17 and return header 18, which require that the supply water temperature be substantially lower than the usual boiler supply water temperature and so return water is mixed with supply water, diluting the loop supply and so reducing the temperature of the loop supply water to within the required limits.

FIG. 5 shows details of the distribution station 503 incorporating the usual orientation of the conventional motorized three-way modulated mixing valve 524 in the boiler supply line 11. The boiler supply line also includes valve 12, isolation valve 13 and the continuation 16 of supply line 11 to heating loop supply header 17 that feeds heating loops 520.

The return line from header 18 to the boiler return reservoir 21 includes a first section 22 to water pump 23, a T connector 514 to the mixing valve 524, boiler return line 25 and isolation valve 26 in the return line.

The conventional (usual) orientation of this valve in the system supply line has first input fed directly by supply line 11, the second input fed by shunt line 515 that feeds return water to the valve from the T connector 514 and the output is to the supply header line 16. The structure of mixing valve 524 and this orientation are shown and described in said co-pending U.S. patent application Ser. No. 222,884. For added safety and ease of maintenance, the supply header 17 may be equipped with an air vent 46 and the return header may be equipped with a purge line controlled by a manually operated valve.

The main station distribution system 503 shown in FIG. 5 can be used with the satellite systems described hereinabove in any of the first, second or third embodiments. For connection to satellite systems like 304 and 305 in the third embodiment (FIG. 3), high limit balancing valves 381 and 391 feed the small diameter insertion lines 382 and 392 of the medium and low temperature satellite systems 304 and 305, respectively. For the first and the second embodiment satellite systems, the insertion lines are fed directly from header 17. Return lines from the satellites, like small diameter lines 387 and 397 from the medium and low temperature satellites 304 and 305, respectively, feed directly into return header 18.

Conclusions

While the invention is described herein in connection with preferred embodiments, it will be understood that it is not intended to limit the invention to those embodiment. It is intended to cover all alternatives, modifications, equivalents and variations of those embodiments and their features as may be made by those skilled in the art within the spirit and scope of the invention as defined by the appended claims.

I claim:

1. A hydronic heating system having a source of hot supply water and a reservoir of cooler return water, a supply water line from said source, a return water line to said reservoir and a multitude of heating loops through which water flows to deliver heat, comprising,
   (a) a main distribution station including a main supply header fed supply water by said supply line and feeding supply water at temperature T to main heating loops, a main return header fed return water from said main heating loops and feeding return water to said water return line and a main pump that compels water flow from said main supply header, through said main loops to said main return header,
   (b) whereby heat from said source flows to said main distribution station heating loops,
   (c) a satellite distribution station including a satellite supply header feeding satellite supply water at temperature lower than temperature T to satellite heating loops, a satellite return header fed return water from said satellite loops and a satellite pump that compels water flow from said satellite supply header, through said satellite loops to said satellite return header,
   (d) a satellite injection water line from said main supply header to said satellite return header,
   (e) a satellite return water line from said satellite supply header to said main return header,
   (f) whereby heat from said main distribution station flows to said satellite distribution station carried by water flow through said satellite injection water line, and
   (g) means responsive to outside temperature for modulating said heat flow to said satellite distribution station.

2. A hydronic heating system as in claim 1 wherein,
   (a) said means for modulating modulates said satellite injection water line water flow.

3. A hydronic heating system as in claim 2 wherein,
   (a) said means for modulating said satellite injection water line water flow is a two position valve in said satellite distribution station.

4. A hydronic heating system as in claim 2 wherein,
   (a) said means for modulating said satellite injection water line water flow is a balancing valve in said satellite distribution station.

5. A hydronic heating system as in claim 2 wherein,
   (a) said means for modulating said satellite injection water line water flow is a modulating valve in said satellite distribution station.

6. A hydronic heating system as in claim 1 wherein, (a) said outside temperature is ambient temperature.

7. A hydronic heating system having a source of hot supply water and a reservoir of cooler return water, a supply water line from said source, a return water line to said reservoir and a multitude of heating loops through which water flows from said supply line to said return line, comprising,

- (a) a main distribution station including a main supply header fed supply water by said supply line and feeding supply water to main heating loops, a main return header fed return water from said main heating loops and feeding return water to said water return line and a main pump that compels water flow from said main supply header, through said main loops to said main return header,
- (b) whereby heat from said source flows to said main station heating loops and the temperature of water flowing through said main heating loops is T,
- (c) a satellite distribution station including a satellite supply header feeding satellite supply water to satellite heating loops, a satellite return header fed return water from said satellite loops and a satellite pump that compels water flow from said satellite supply header, through said satellite loops to said satellite return header,
- (d) a satellite injection water line from said main supply header to said satellite return header,
- (e) a satellite return water line from said satellite supply header to said main return header,
- (f) whereby the temperature of water flowing through said satellite heating loops is substantially lower than T, and
- (g) means responsive to outdoor temperature for modulating said heat flow to said satellite distribution station.

8. A hydronic heating system as in claim 7 wherein there is further provided,

- (a) a three-way valve in said main distribution station feeding some return water directly from said main return water line to said main supply water line to reduce the temperature of water flow to said main heating loop supply header and
- (b) said means for modulating controls said valve to vary said loop water temperature and includes
- (c) means responsive to said main loop water temperature and said outdoor temperature,
- (d) whereby said main loop water temperature is increased when said outdoor temperature falls.

9. A hydronic heating system as in claim 8 wherein:

- (a) said means responsive to said temperature of water flow to said main heating loop is a thermostatic three-way valve control system having a main loop water temperature bulb sensor and a thermostatic three way valve actuator,
- (b) a main loop water temperature bulb capillary tube connects fluid from said main loop water temperature bulb to said valve actuator,
- (c) said means responsive to the outdoor temperature is an outdoor temperature bulb sensor and
- (b) an outdoor bulb capillary tube connects fluid from said outdoor bulb to said valve actuator.

10. A hydronic heating system as in claim 9 wherein:

- (a) said main loop water temperature bulb is attached to said main loop supply water line, and
- (c) said thermostatic actuator controls said three-way valve water flow ratio.

11. A hydronic heating system as in claim 8 wherein:

- (a) said three-way valve is a diverting valve in said main return water line.

12. A hydronic heating system as in claim 8 wherein:

- (a) said three way valve is a mixing valve in said main supply water line.

* * * * *